UNITED STATES PATENT OFFICE.

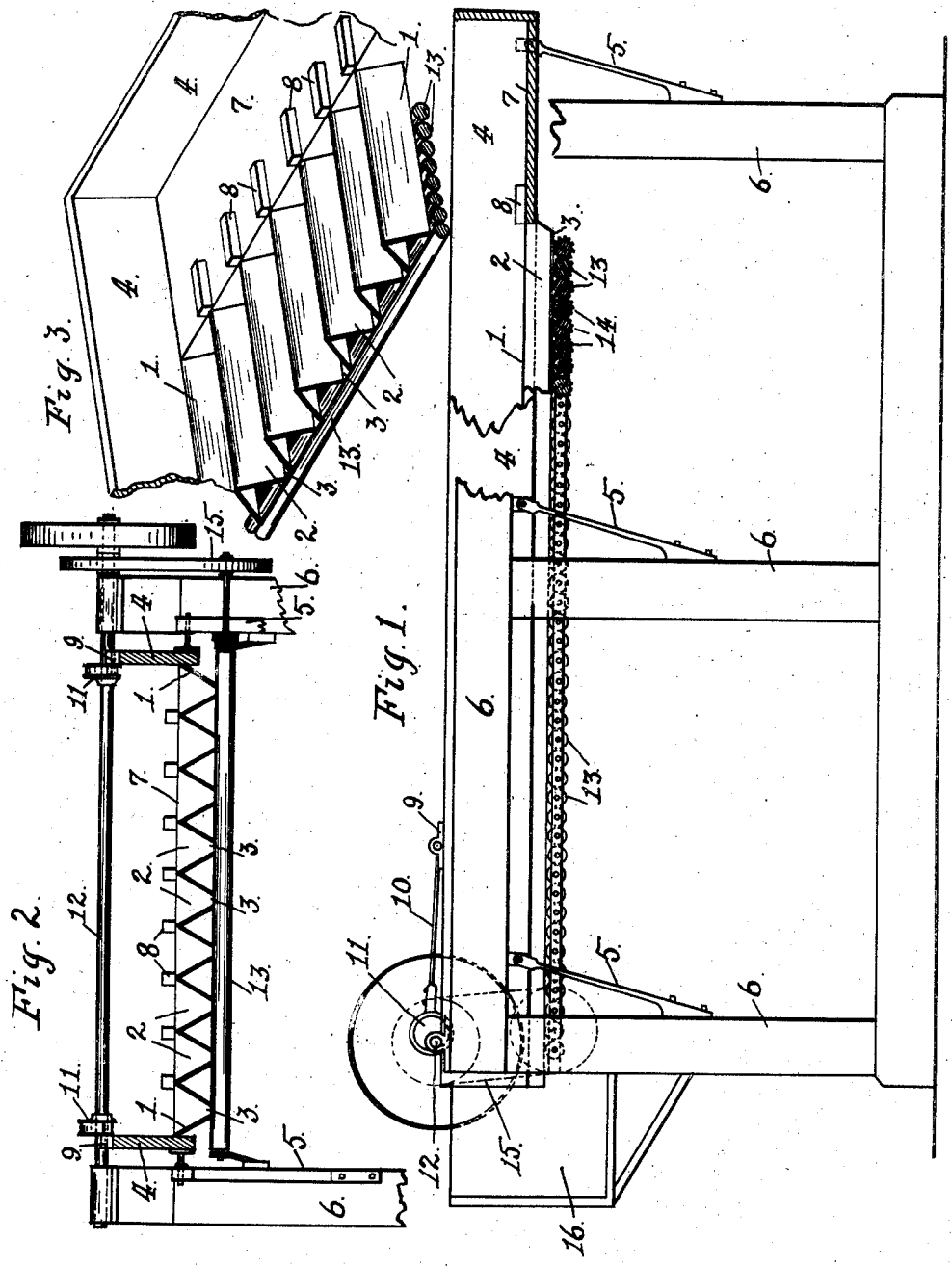

RICHARD G. FONTANA, OF SAN FRANCISCO, CALIFORNIA.

CHERRY-STEMMER.

No. 883,708.  Specification of Letters Patent.  Patented April 7, 1908.

Application filed July 9, 1907. Serial No. 382,912.

*To all whom it may concern:*

Be it known that I, RICHARD G. FONTANA, a citizen of the United States, residing in the city and county of San Francisco and State of California, have invented certain new and useful Improvements in Cherry-Stemmers, of which the following is a specification.

My invention relates to the class of fruit-stemming machines. Its object is to provide a simple, efficient and practical machine, especially adapted for removing the stems from cherries.

My invention consists generally, in a slotted trough or channel to receive and hold the cherries, the stems of which protrude through the slot, and in suitable grippers, preferably in the form of rotatable, adjacent rolls, disposed to seize the protruding stems, and pull them from the cherries.

It also consists in the novel construction and arrangement of the machine which I shall hereinafter fully describe, by reference to the accompanying drawings in which Figure 1 is a side view, broken, of my machine. Fig. 2 is a cross-sectional view, broken, of the same. Fig. 3 is a perspective, broken view of the feed end of the machine.

1 is a table, the surface of which is trough-like. The table may be a single trough, or it may be composed of a plurality of troughs united, or it may be, as here shown, a unitary structure with a plurality of parallel troughs 2 with inclined sides, said troughs extending from head to foot of the table. Each trough has in its bottom, extending substantially throughout its length, a slot 3, the width of which is too small to allow the cherries to fall through, but is large enough to readily permit the stems of the cherries to protrude through it.

The table 1 is mounted in a suitable frame 4, which is carried upon spring supports 5, rising from a stand 6. On the supports 5, the table is given a shaking reciprocating motion in the direction of its length.

At the head or feed end of the table, is a feeder board 7, provided with guide cleats 8, of suitable character, adapted to direct the cherries to the troughs 2. Any suitable mechanism may be employed to shake the table and feed board. I have here shown, for this purpose, a bearing 9 secured to the frame 4 of the table, to which bearing is connected a rod 10, the outer end of which is connected with an eccentric 11 on a drive shaft 12.

13 are the stem gripper rolls. These lie directly under the troughs 2, and are arranged as traversing the plane of the slots 3 of the troughs, as shown. The rolls may be in any number, and they lie side by side, in close proximity to each other. They may be geared throughout, as shown at 14, in such manner that adjacent rolls rotate in opposite directions. They may be driven from the main shaft by a belt 15, as shown in Figs. 1 and 2; and they may be made of any suitable material.

A suitable receptacle for the stems may be provided below the rolls, and another receptacle, such as 16, for the cherries, may be disposed at the foot of the table.

The operation of the machine is as follows:—The cherries are supplied to the feed board 7, on which, due to its shaking motion and its spring supports 5, they spread out, one layer thick, and advance down between the guide cleats 8, by which they are directed into the troughs 2. They fall singly and successively into the troughs, in which, due to the inclined walls and the shaking motion, they seek the trough bottoms, turn their stems downwardly and protrude them through the slots 3, and so advance, in single file, from the head to the foot. The protruding stems are caught between the rolls 13, which rotating, pull the stems from the resisting cherries, which cannot pass through the slots; and while the stems are passed between the rolls and discharged, the stemmed cherries are delivered from the foot of the table into the receptacle 16.

Having thus described my invention, what I claim as new and desire to secure by Letters Patent is,

1. A cherry-stemmer comprising a trough having a slot too small for the passage of the cherry while permitting the protrusion through it of the stem, and rotatable rolls, exterior to the trough and disposed transversely to its slot, to grip the protruding stem and pull it from the cherry.

2. A cherry-stemmer comprising a trough having a slot in its bottom too small for the passage of the cherries while permitting the protrusion through it of the stems, means for advancing the cherries through the trough, and rotatable rolls below the trough disposed transversely to its slot, to grip the protruding stems and pull them from the cherries.

3. A cherry-stemmer comprising a shaking, trough-like table with a slot in its bottom too small for the passage of the cherries while permitting the protrusion through it of their stems, and rotatable rolls below the table disposed transversely to its slot, to grip the protruding stems and pull them from the cherries.

4. A cherry-stemmer comprising a reciprocating, trough-like table with a slot in its bottom too small for the passage of the cherries while permitting the protrusion through it of the stems, and rotatable rolls to grip the protruding stems and pull them from the cherries, said rotating rolls being arranged below the table transversely to the slot of the table and the direction of movement of the table.

In testimony whereof I have signed my name to this specification in the presence of two subscribing witnesses.

RICHARD G. FONTANA.

Witnesses:
  N. A. ACKER,
  D. B. RICHARDS.